United States Patent Office 2,983,703
Patented May 9, 1961

2,983,703
EPOXYALKYL ALLYLARYLETHERS

Gaetano F. D'Alelio, South Bend, Ind., assignor to Koppers Company, Inc., a corporation of Delaware No Drawing. Original application Oct. 20, 1954, Ser. No. 463,609. Divided and this application Nov. 19, 1957, Ser. No. 697,309

7 Claims. (Cl. 260—45.5)

This application is concerned with certain new epoxyalkyl alkenylaryl ethers. It is concerned with these substances in their monomeric as well as polymeric form.

Further, the invention is concerned with insoluble or "cured" polymers which can be obtained by aftertreating epoxyalkyl alkenylaryl ether polymers to cause cross-linking. This application is a division of my copending application S.N. 463,609 filed October 20, 1954.

The invention is particularly concerned with epoxyalkyl alkenylaryl ethers of the formula

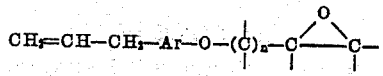

in which Ar is an arylene radical, $n$ is an integer having a value no greater than 8, and the unoccupied valences are satisfied by substituents of the class consisting of hydrogen and alkyl groups of no more than 7 carbon atoms, the number of carbon atoms in the epoxyalkyl group totaling no more than 10 carbon atoms.

In particular the invention is concerned with glycidyl allylaryl ethers particularly glycidyl allylphenyl ethers.

It will be realized that the above-disclosed monomeric substances possess two active polymerizable groups, that is, the allyl group and the oxirane radical. The coexistence of these different type active polymerizable groups in a single monomer provides means for the controlled production of polymeric materials of varying physical characteristics. It is possible by per-catalysis to cause polymerization through the ethylenically unsaturated group and thereafter cause the oxirane group to react to give varying amounts of cross-linking and thus polymers of varying physical characteristics such as for example, insolubility, infusibility, toughness, etc.

Alternately, the monomeric compounds of this invention can be polymerized via the oxirane radical by, for example, alkaline catalysis, to produce a linear polymeric structure. Thereafter, by suitable catalysis such as for example, benzoyl peroxide or a Friedel-Crafts catalyst such as aluminum chloride, the ethylenically unsaturated portions of the polymer can be caused to react to give varying degrees of cross-linking. Thus, via these different mechanisms polymeric materials of the aforedescribed varying physical characteristics can be produced.

Conveniently, the polymeric materials produced by above-described reactions can be represented in part by the below set out formulae in which (a) represents units derived by polymerization of the alkenyl portion of the molecule and (b) represents units derived from polymerization by the oxirane portion.

(a) 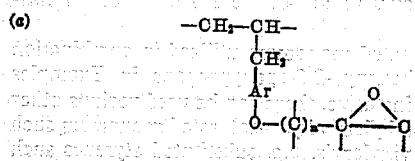

(b) 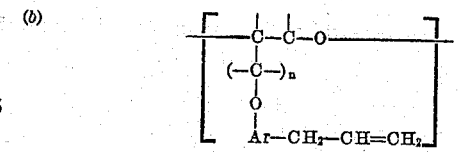

in which Ar is an arylene radical, $n$ is an integer having a value no greater than 8, and the unoccupied valences are satisfied by substituents of the class consisting of hydrogen and alkyl groups of no more than 7 carbon atoms, the number of carbon atoms in the oxyalkyl group totaling no more than 10 carbon atoms.

Portions of the aforedescribed cross-linked polymeric materials of varying physical characteristics can be represented by the formula

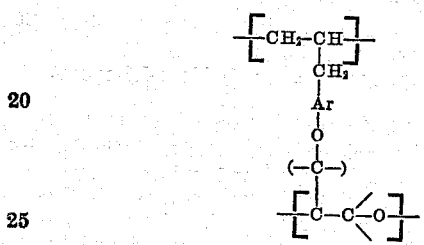

in which Ar is an arylene radical, $n$ is an integer having a value no greater than 8, and the unoccupied valences are satisfied by substituents of the class consisting of hydrogen and alkyl groups of no more than 7 carton atoms, the number of carbon atoms in the oxyalkyl group totaling no more than 10 carbon atoms.

The monomeric materials of this invention are useful in the preparation of polymeric materials. As used herein the term "polymer" embraces both homopolymers and copolymers. The term "copolymer" as used herein embraces polymeric materials derived from the polymerization of two or more monomeric materials. That is 2, 3, 4, 5 . . . ad infinitum copolymerizable monomeric substances can be copolymerized to produce a "copolymer."

The polymers and copolymers of this invention are useful as molding, laminating, coating, adhesive and potting compounds. These polymers can be cross-linked by a variety of means. For example, the vinyl polymerized materials which contain oxirane radicals can be cross-linked by heating to rupture the oxirane ring or by catalysis. Further the cross-linking can be effected by a variety of cross-linking agents, such as for example polyisocyanate compounds, polyoxirane compounds, polyamines, polyols, etc.

As used herein the terms "parts" and "percentages" indicate parts and percentages by weight unless otherwise specified.

The invention herein is illustrated by, but not restricted to, the following preferred embodiments.

EXAMPLE I

1-(4-allylphenoxy)-2,3-epoxypropane

An aqueous solution of 4-allylphenolate is prepared from 67 grams (0.5 mole) 4-allylphenol, 21 grams (0.53 mole) sodium hydroxide and 250 ml. water and chilled. This solution is added with stirring over a period of approximately 1 hour to 69.8 grams (0.75 mole) of epichlorohydrin at 60° C. and stirred for an additional hour while the temperature is maintained at 60° C. The reaction mixture is diluted with approximately equal volume of water and extracted with five 100 ml. portions of ether. The ether portions are combined and the ether removed by evaporation under vacuum. This oil is flash distilled at approximately 175° C. and 1 mm. mercury to yield a distillate, a mixture of 1-(4-allylphenoxy)-2,3-epoxypropane and minor portions of 1-(4-allylphenoxy)-2,3-propanediol which can be removed by cooling the distillate to approximately minus 5–10° C., and filtration. This diol is disclosed and claimed in my copending application filed concurrently herewith.

The filtrate, after removal of the unsaturated diol contains approximately 90 percent of the epoxypropane compound which is identified by carbon, hydrogen and oxirane analyses and hydrogen absorption, the results of which are in close agreement with the theoretical values.

It will be realized that in Example I for the 4-allylphenol there used, there can be substituted equimolar quantities of allylphenols illustrated by such compounds as for example, 2-allylphenol, 3-allylphenol, the allyl-1- and 2-naphthos and the like. Similarly in place of epichlorohydrin there can be used other halo-epoxyalkanes such as for example, 1-chloro-2,3-epoxybutane, 1-chloro-3,4-epoxybutane, 2-chloro-3,4-epoxybutane, 1-chloro-2-methyl-2,3-epoxypropane, 1-bromo-2,3-epoxypentane, 2-chloromethyl-1,2-epoxybutane, 1-bromo-4-methyl-3,4-epoxypentane, 1-bromo-4-ethyl-2,3-expoxypentane, 4-chloro-2-methyl-2,3-epoxypentane, 1-chloro-2,3-epoxyoctane, 1-chloro-2-methyl-2,3-epoxyoctane, or 1-chloro-2,3-epoxydecane.

There are obtained the various epoxyalkyl allylaryl ethers of this invention which are characterized by hydrogen absorption, carbon, hydrogen and oxirane oxygen analyses which are in substantial agreement with the theoretical values. It will be realized that there are obtained by the foregoing procedure minor quantities of the various dihydroxyalkyl-allylaryl ethers which are disclosed and claimed in my copending application filed concurrently herewith.

EXAMPLE II

One hundred parts of 1-(4-allylphenoxy)-2,3-epoxypropane, obtained as in Example I is admixed with three-fourths part benzoyl peroxide. The atmosphere is alternately purged with nitrogen and evacuated to approximately 0.5 mm. mercury. The compound is then heated at approximately 50–60° C. under an atmosphere of nitrogen. After approximately 18 hours heating there is obtained polymeric 1-(4-allylphenoxy)-2,3-epoxypropane which is a linear, soluble polymer containing oxirane oxygen.

There can be substituted for the compound used herein various other 1-(allylphenoxy)-2,3-epoxypropanes and there are obtained the corresponding homopolymers.

Further, for the benzoyl peroxide utilized herein there can be substituted a variety of peroxy catalysts such as hydrogen, acetyl, acetyl-benzoyl, phthalyl and aluroyl peroxides, tertiary-butyl hydroperoxide, etc., and other per compounds, for example ammonium persulfate, sodium persulfate, sodium perchlorate and the like.

It will be realized that heating can effect rupture of the epoxy ring. Accordingly, it is desirable that the temperatures at which the various vinyl polymerizations are conducted be as low as is possible and at which the polymerization occurs at a sufficiently rapid rate.

Example II illustrates the vinyl-homopolymerization of the compounds of this invention which yield polymers having a plurality of groups of formula

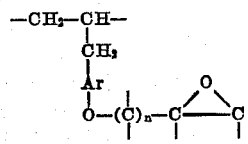

in which Ar, $n$ and the like have the meanings heretofore set forth.

It will be realized that mixtures of two or more of the various monomers of this invention can be polymerized together to yield polymeric substances. For example, utilizing the procedures of Example II mixtures of 1-(2-allylphenoxy)-2,3-epoxypropane and 1-(4-allylphenoxy)-2,3-epoxypropane can be polymerized via vinyl polymerization. Additionally, mixtures of two or more of the polymers of this invention can undergo epoxy-polymerization according to procedures set forth in the following Example III.

EXAMPLE III

One hundred seventy-five parts 1-(4-allylphenoxy)-2,3-epoxypropane (prepared as in Example I) is admixed with 2 parts of an aqueous 40 percent sodium hydroxide solution and the mixture heated at approximately 100° C. for approximately 4 hours. There is obtained a soluble linear homopolymeric 1-(4-allylphenoxy)-2,3-epoxypropane containing a plurality of oxyethylene linkages.

It will be realized that various other epoxyalkyl allylaryl ethers can be substituted for the 1-(4-allylphenoxy)-2,3-epoxypropane here used and that their respective homopolymers are obtained. Further, for the sodium hydroxide here used as a catalyst there can be substituted various other strong alkaline hydroxides or weak acids, such as for example, succinic acid.

The foregoing example illustrates the epoxy-homopolymerization of the compounds of this invention which yield polymers having a plurality of units of the formula

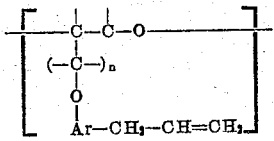

EXAMPLE IV

Five parts 1-(4-allylphenoxy)-2,3-epoxypropane, 4.5 parts styrene and three-fourths part benzoyl peroxide are admixed in a reaction vessel and the atmosphere swept out and filled with nitrogen. The polymerizable mass is heated at 60° C. for 15 hours. There is obtained a soluble, linear, heat-curable copolymer.

EXAMPLE V

Thirty-five parts 1-(4-allylphenoxy)-2,3-epoxypropane are admixed with 20 parts maleic anhydride and 0.2 part benzoyl peroxide. This mass is polymerized according to the procedure set forth in Example IV. There is obtained a soluble linear polymeric product which can be cured by heating or by acid or basic substances.

EXAMPLE VI

Five parts 1-(4-allylphenoxy)-2,3-epoxypropane, 4.5 parts methyl methacrylate and three-fourths part benzoyl peroxide are admixed in a reaction vessel and the atmosphere is swept out and filled with nitrogen. The polymerizable mass is heated for 2 hours at 30° C. after which time the polymer is too thick to pour. There is obtained a linear soluble, heat-curable copolymer.

EXAMPLE VII

A mixture of 5 parts 1-(4-allylphenoxy)-2,3-epoxypropane, 45 parts acrylonitrile and 1.5 parts benzoyl peroxide is prepared and the atmosphere swept out and filled with nitrogen. After heating approximately one day at 75° C. a hard polymerization product is obtained. There is obtained a linear, heat-curable copolymer soluble in dimethyl formamide.

EXAMPLE VIII

A mixture of 5 parts 1-(4-allylphenoxy)-2,3-epoxypropane, an equimolar quantity of butadiene, and 3 parts benzoyl peroxide is prepared and the atmosphere swept out and filled with nitrogen. After heating 3 hours at 30° C. and 20 hours at 60° C. there is obtained an elastomeric polymer.

For the unsaturated monomers utilized in combination with 1-(4-vinylphenoxy)-2,3-epoxypropane in Examples IV through VIII inclusive, there can be used various other copolymerizable ethylenically unsaturated monomers such as, for example vinylaryls, e.g. substituted styrenes such as methyl and dimethylstyrenes, chloro- and polychlorostyrenes, cyanostyrenes, etc., vinylnaphthalenes, etc.; vinylidine chlorides; acrylic acid and the acrylates e.g. methyl and ethylacrylates, and the like. Further, mixtures of one or more of these copolymerizable ethylenic unsaturated monomers can be utilized in place of the single monomers utilized in the immediately foregoing copolymer examples.

Similarly, in place of the 1-(4-allylphenoxy)-2,3-epoxypropane utilized in the foregoing copolymer examples, there can be utilized the various other monomeric epoxyalkyl allylaryl ethers of this invention, particularly the 2-allylphenoxy epoxyalkanes.

It will be further realized that in place of the single monomeric epoxyalkyl allylaryl ethers utilized in the immediately foregoing examples, there can be substituted mixtures of one or more of the epoxyalkyl allylaryl ethers of this invention.

The proportions of the epoxyalkyl alkenylaryl ethers of this invention and the copolymerizable ethylenically unsaturated compounds can be varied as desired to give copolymers of varying properties. In copolymers in which the epoxy group of the epoxyalkyl allylaryl ether is to be utilized for cross-linking purposes by aftertreatment of said polymer to produce an insoluble, infusible polymeric composition, it is advantageous to utilize the monomeric epoxyalkyl alkenylaryl ethers in about 2–10 molar percent of the copolymerizable mass.

EXAMPLE IX

A polymerizable mass containing equimolar parts of 1-(4-vinylphenoxy)-2,3-epoxypropane and ethylene oxide is admixed with 1 part succinic acid per 100 parts of polymerizable mass and is heated at 80° C. for approximately 4–5 hours. There is obtained a soluble linear copolymer containing a plurality of oxyethylene linkages.

EXAMPLE X

Example IX is repeated substituting for the ethylene oxide there used an equimolar quantity of epichlorohydrin. There is obtained a soluble linear copolymer containing a plurality of oxyethylene linkages.

EXAMPLE XI

Example IX is repeated substituting for the ethylene oxide there used an equimolar quantity of styrene oxide. There is obtained a soluble linear copolymer having a plurality of oxyethylene linkages.

EXAMPLE XII

Example IX is repeated substituting for the ethylene oxide there used an equimolar quantity of glycidyl phenyl ether. There is obtained a soluble linear copolymer having a plurality of oxyethylene linkages.

EXAMPLE XIII

Example IX is repeated substituting for the ethylene oxide there used one-half the molar quantity of the diglycidyl ether of bis-phenol. There is obtained an insoluble copolymer containing a plurality of oxyethylene linkages.

It will be realized that in place of the various compounds utilized in combination with 1-(4-allylphenoxy)-2,3-epoxypropane in Examples IX through XIII inclusive, various other copolymerizable oxiranes-containing monomers such as for example, propylene oxide, butylene oxide, butylene dioxide, cyclohexene oxide, glycide and the like can be utilized. Similarly, in place of the 1-(4-allylphenoxy)-2,3-epoxypropane utilized in the immediately foregoing copolymer examples, there can be utilized the various other monomeric epoxyalkyl allylary ethers of this invention, particularly the 2-allylphenoxy epoxyalkanes.

It will be further realized that in place of the single monomeric oxirane-containing monomers there can be used mixtures of one or more of these copolymerizable oxirane-containing monomers. Additionally in place of the single monomeric epoxyalkyl allylaryl ether utilized in the immediately foregoing examples there can be substituted mixtures of one or more of the epoxyalkyl alkenylaryl ethers of this invention.

As stated before with relation to the vinyl copolymerizations, the proportions of the epoxyalkyl alkenylaryl ethers of this invention and the copolymerizable oxirane-containing monomers can be varied as desired to yield a variety of copolympers.

EXAMPLE XIV

The soluble polymer of Example II is heated for 15 hours at 125° C. after which time the polymerization product is too thick to pour at 125° C. Continued heating produces a light solid copolymer which is insoluble in 100 parts methanol or 95 percent ethanol per part polymer.

Heating of the polymerization products of Examples IV–VIII inclusive at 100° C. for 5–10 hours produces cross-linked polymers which are insoluble.

EXAMPLE XV

One hundred parts of the polymer of Example III is admixed with 4 parts 2,4-toluene diisocyanate and the mixture heated for one hour at 75° C. There is obtained an insoluble, infusible cross-linked copolymer.

There can be substituted in the above procedure for the polymer of Example III used above, polymers produced by the vinyl polymerization of the various epoxyalkyl allylaryl ethers of this invention. Additionally there can be substituted for the 2,4-toluene diisocyanate other diisocyanates such as phenylenediisocyanate; 2,6-toluenediisocyanate; 1,5-naphthalenediisocyanate; 1-chloro-1-phenylene-2,4-diisocyanate; 4,4'-xenylenediisocyanate; methylene bis(4-phenylisocyanate); hexamethylenediisocyanate; tetramethylenediisocyanate and the like. The amount of these diisocyanates utilized is governed by the degree of cross-linking desired.

EXAMPLE XVI

One hundred parts of the polymer of Example IV is admixed with 10 parts of the diglycidyl ether of bisphenol and 1 percent ethylene diamine and the mixture warmed gently. There is obtained a thermoset resin.

EXAMPLE XVII

Example XVI is repeated utilizing in place of the diglycidyl ether of bisphenol an equal weight of the resin described at column 7 of my U.S. Patent 2,658,885 granted November 10, 1953. There is obtained a thermoset resin. It will be realized that the various epoxy alkoxy hydrocarbon substituted phenol aldehyde resins described in that patent can be utilized in the foregoing procedure. Additionally the epoxy alkoxy chlorine substituted phenol aldehyde resins described in my U.S. Patent 2,658,884 granted November 10, 1953 can be utilized in the foregoing procedure.

It is to be noted that in place of ethylene diamine catalyst utilized in Examples XVI and XVII there can be substituted equivalent portion of such amine catalysts as tetrahydroquinoline and piperidine to obtain substantially similar results.

EXAMPLE XVIII

One hundred parts of the polymer of Example II is admixed with 10 parts of the hexamethylene diamine and the mixture heated at 100° C. for 3–4 hours. There is obtained a thermoset polymer. For the hexamethylenediamine utilized herein there can be substituted varying quantities of other diamines such as for example, ethylene, propylene, tetramethylene, decamethylene, phenylene, tolylene, and the like diamines.

It is to be understood that in Examples XV–XVIII inclusive, which illustrate various cross-linking reactions of the polymer product of Example XII, there can be substituted for this polymeric product any of the polymers of this invention containing oxirane oxygen. The various homopolymers and copolymers of the epoxyalkyl allylaryl ethers of this invention obtained by per-catalyzed polymerization, or mixtures thereof, can be reacted with such cross-linking agents as polyisocyanate compounds, polyoxirane compounds, polyamines, phenolic resins and aminoplasts, e.g. ureas, melamines, etc. to produce thermoset resins.

The foregoing examples set forth the preparation of a number of monomers and polymers of this invention. It will be realized that these examples illustrate methods of preparation which are applicable to a wide range of starting materials to produce monomers and polymers of this invention. For example, the reaction of the alkali metal salts of various allylaryloxy compounds with halo-epoxyalkanes yields the monomers of this invention and the alkali metal halides. It is to be understood that the term "aryl" embraces a variety of aromatic nuclei such as phenyl naphthyl, and the lower alkyl and halogen substituted nuclei, that is the aryl nuclei containing one or more methyl, ethyl, propyl, butyl, chloro- or bromo-substituents.

While the invention has been described with reference to particular embodiments thereof, it will be understood that in its broadest aspects the invention may be variously embodied within the scope of the invention as set forth herein and in the appended claims.

What is claimed as new is:

1. A copolymer of an epoxyalkyl allylaryl ether of the formula

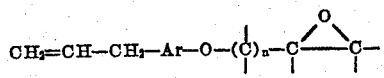

in which Ar is an arylene radical, $n$ is an integer having a value of at least one and no greater than 8, and the unoccupied valences are satisfied by substituents of the class consisting of hydrogen and alkyl groups of no more than 7 carbon atoms, the number of carbon atoms in the epoxyalkyl group totaling no more than 10 carbon atoms and at least one other copolymerizable oxirane-containing monomer.

2. A copolymer of claim 1 in which the copolymerizable oxirane-containing monomer is ethylene oxide.

3. A copolymer of claim 1 in which the copolymerizable oxirane-containing monomer is epichlorohydrin.

4. A copolymer of claim 1 in which the copolymerizable oxirane-containing monomer is styrene oxide.

5. A copolymer of claim 1 in which the copolymerizable oxirane-containing monomer is glycidyl phenylether.

6. A copolymer of claim 1 in which the copolymerizable oxirane-containing monomer is diglycidyl ether of bisphenol.

7. The reaction product of (a) a copolymer of an epoxyalkyl allylaryl ether of the formula

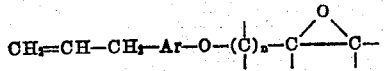

in which Ar is an arylene radical, $n$ is an integer having a value of at least 1 and no greater than 8, and the unoccupied valences are satisfied by substituents of the class consisting of hydrogen and alkyl groups of no more than 7 carbon atoms, the number of carbon atoms in the epoxyalkyl group totaling no more than 10 carbon atoms and at least one other copolymerizable ethylenically unsaturated monomer with (b) a copolymerizable oxirane-containing monomer.

References Cited in the file of this patent
UNITED STATES PATENTS

| 2,765,296 | Strain | Oct. 2, 1956 |
| 2,783,250 | Payne et al. | Feb. 26, 1957 |